No. 864,233. PATENTED AUG. 27, 1907.
F. EASOM & T. J. BIGGS.
VARIABLE SPEED GEARING.
APPLICATION FILED APR. 30, 1906.
2 SHEETS—SHEET 2.
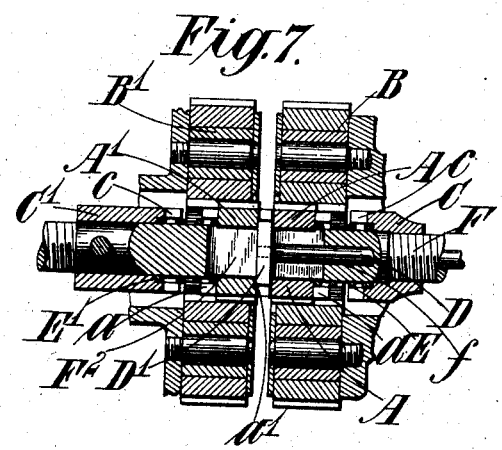
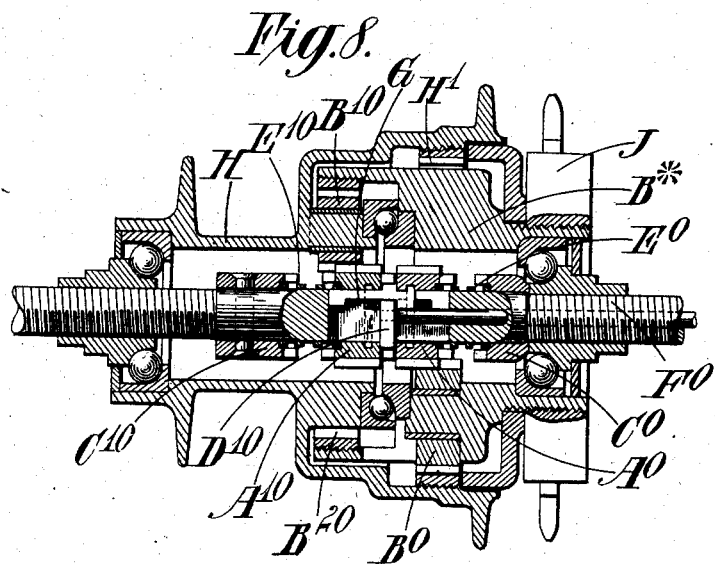

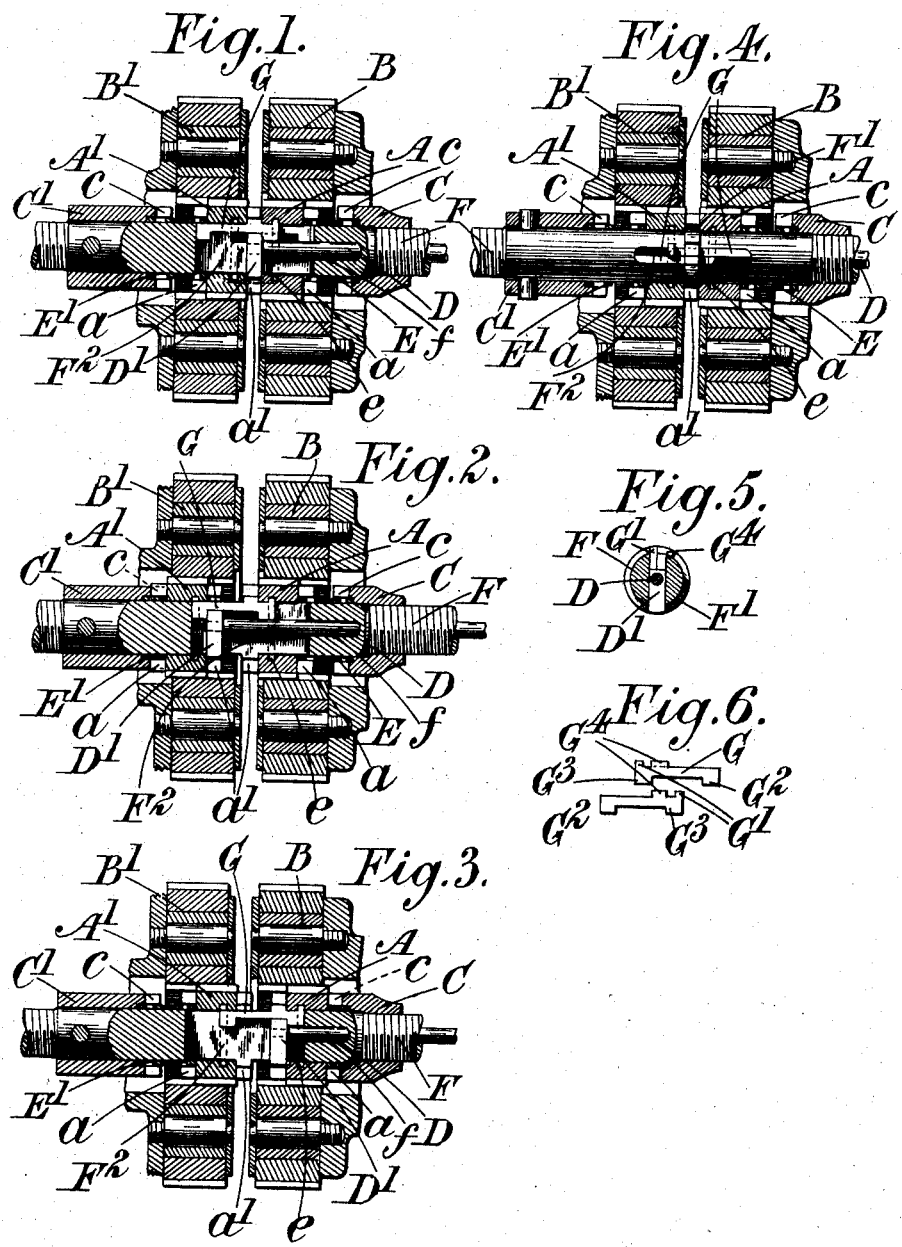

UNITED STATES PATENT OFFICE.

FREDERICK EASOM, OF BEESTON, AND THEODORE JAMES BIGGS, OF NOTTINGHAM, ENGLAND, ASSIGNORS OF ONE-THIRD TO HUMBER LIMITED, OF BEESTON, ENGLAND.

VARIABLE-SPEED GEARING.

No. 864,233.	Specification of Letters Patent.	Patented Aug. 27, 1907.

Application filed April 30, 1906. Serial No. 314,571.

*To all whom it may concern:*

Be it known that we, FREDERICK EASOM and THEODORE JAMES BIGGS, subjects of the King of England, and residing, respectively, at Beeston and Nottingham, in Nottinghamshire, England, have invented certain new and useful Improvements in Variable-Speed Gearing, of which the following is a specification.

This invention relates to variable speed gearing chiefly applicable to velocipedes and the like and refers more particularly to hub-contained gearing of the kind in which two sets of epicyclic wheels are employed.

Hitherto it has been usual to employ in connection with the planet pinions of the epicyclic gears a sun pinion common to both sets and mounted on the fixed axle, this sun pinion being capable of being put into gear with both sets of epicyclic pinions or out of gear with one while remaining in gear with the other set, and by the same movement be locked to the fixed axle in order to give the requisite gear changes. The objection to this arrangement is the difficulty experienced in moving the pinions into gear with one or the other sets of epicyclic pinions after it has been moved out of gear as desired, and it is the chief object of the present invention to obviate this difficulty.

According to this invention two separate and distinct sun pinions are arranged side by side on the fixed axle and one, that nearest the driving member, gears with the set of epicyclic pinions carried by the said member and the other pinion with the set of epicyclic pinions carried by the wheel hub.

The sun pinions are each formed with clutch members or teeth on both sides, those on the inner side serving to connect one pinion to the other, and those on the outer side to connect them to their respective fixed clutch members which are secured to the fixed axle on the outer sides of the pinions, so that an outward movement of either of the pinions disconnects the one from the other and a further movement in the same direction rigidly connects it to the fixed axle through the agency of the corresponding fixed clutch. Springs are interposed between the pinions and their respective fixed clutches on the axle so as to move the said pinions towards one another.

In order to insure that these sun pinions are not both locked to the spindle at the same time, and to insure their being returned into the position in which they can be locked together, the sun pinions are operatively connected with a reciprocating rod or the like by mechanism which separately moves or insures the separate movement of either sun pinion. The operating mechanism disposed between the reciprocating rod and the sun pinions comprises a split bolt or slippers having projections or the like engaging with the sun pinion and similar projections adapted to be engaged by the rod itself.

Figures 1, 2 and 3 are sectional elevations showing the sun pinions and their operating mechanism in the different positions they occupy during the various phases of the gear. In these views the planet pinions with which the respective sun pinions are constantly in mesh and which do not slide are indicated as merely showing their relation to the sun pinions during the phases of the gear and not as in an actual construction of the gear. Fig. 4 is a similar view to Fig. 1 showing the arrangement of the slippers. Fig. 5 is a section through the stationary spindle. Fig. 6 is a view of the slippers separately. Fig. 7 is a view similar to Fig. 1 showing a modification in which the slippers are omitted. Fig. 8 is a sectional elevation of a hub embodying the mechanism according to the present invention.

A $A^1$ are the sun pinions, B $B^1$ their respective planet pinions, C is a stationary clutch with which the pinion A can be locked, $C^1$ a similar clutch with which the pinion $A^1$ can be locked.

D is the reciprocating operating rod, E $E^1$ are the springs for operating the sun pinions.

F is the stationary spindle, G are the slippers connecting the reciprocating rod with the pinions.

The two sun pinions A $A^1$ are loosely mounted upon the stationary hub spindle F so that they can rotate on the spindle and also move longitudinally upon it. Mounted on the stationary spindle is a collar $F^1$ against which the pinions A $A^1$ are forced by the springs E $E^1$ respectively. This collar prevents the pinions being moved too far and avoids the likelihood of either of the pinions coming into mesh with the planet pinions of its neighbor. On their outer sides the pinions A $A^1$ have jaw clutch members $a$ and are also provided on their inner sides with similar clutch members, these latter clutch members being adapted to engage and lock the pinions together when the parts are in the position illustrated in Fig. 1. The collar C is screwed on to the spindle and the collar $C^1$ secured to the spindle by a pin; these collars may, however, be secured in any other appropriate manner. The spindle F is bored centrally at $f$ for the passage of the operating rod D which carries at its inner end a cross pin $D^1$. The spindle is also slotted and the pin on the end of the reciprocating rod passes through the slot $F^2$ in the spindle.

Assuming the parts to be in the position shown in Fig. 1, the pinions A $A^1$ are locked together by the clutch teeth $a^1$ so that they rotate together as one. When thus locked the hub which carries the planet pinions $B^1$ is rotated at the same speed as the driving member, since the planet pinions B being carried by the driving member gear with an internal ring of teeth on the hub and are also locked to the planet pinions B¹ which are carried by the hub. If now, the operating rod D be moved to the left, the cross pin will engage with an inwardly extending projection G³ on the slipper G which is also in engagement by projections G¹ and G⁴ with an inwardly extending collar on the sun pinion A¹. This pinion will therefore be moved to the left against the action of its spring E¹ until by its clutch surface $a$ it is locked to the teeth $c$ of the clutch member C¹. The pinion A will not be interfered with by this motion of the pinion A¹ but will remain pressed against the collar F¹ by its spring E. The parts are now in the position shown in Fig. 2 which is the low speed of the gear, the motion of the driving member being transmitted to the planet pinions B¹ while the pinion A rotates idly.

The high speed of the gear is obtained by moving the operating rod D to the extreme right. During the movement of the rod, the cross pin will be moved from contact with the inwardly extending projection G³ of the slipper connected with the pinion A¹ and will come in contact with the projection G³ of the slipper G connected with the pinion A causing this pinion to be moved to the right against the action of its spring E. Before the pinion A is locked by its clutch surface $a$ to the teeth $c$ of the member C, the sun pinion A¹ will be moved out of contact with the teeth $c$ of the clutch C¹ so that the two sun pinions are not locked at one and the same time to their respective stationary clutch members. The spring E¹ is intended to accomplish this return movement, but should the clutch surfaces not be in a position to permit this disengagement or should the spring from any reason fail to act, the slipper G insures the disengagement of the pinion from the clutch before the pinion A¹ is locked to its clutch member. The cross pin for this purpose engages with the projection G² of the slipper connected with the pinion A¹ and moves it into the position shown in Fig. 3, and also moves the pinion A into the position also shown in that figure.

It is to be noted that the slippers G will without the aid of the springs E E¹ effect the operation of the pinions A A¹ in both directions to change the speed of the gear from the high to the low or vice versa. These slippers cannot, however, return the pinions into the position in which they are locked together as shown in Figs. 1 and 4, and where this phase of the gear is required, the springs E E¹ must be relied upon. The slippers G are disposed side by side in the slotted or hollow part of the spindle as shown in Figs. 4 and 5, and rest upon the cross pin D¹. The arrangement of the projections on these slippers is clearly shown in Fig. 6.

Referring now to the construction shown in Fig. 7 in which the slippers G are omitted. The cross pin D¹ in this case projects at both ends through the slots in the spindle F so as to engage with the inner ends of the pinions A A¹. In the operation of the sliding rod D this cross pin moves either of the pinions in accordance with this direction of motion to their extreme outer position, that is to say, into the position in which the pinions are locked to the stationary clutch members C C¹, the springs E E¹ being relied upon to return the pinions to their normal position in which the pinions are locked together, as shown in the figure.

As above stated, the flat pinions B B¹ as illustrated in Figs. 1 to 4 and 7, are not intended to represent an actual embodiment of the gear, being shown diagrammatically as indicating the relative position of the pinions to the sun pinions during the various changes. A preferred embodiment of the entire gear showing the application of the present invention is illustrated in Fig. 8.

The planet pinions B⁰ are carried by a block or plate B* connected with the driving sprocket J and the planet pinions B¹⁰ are carried by the wheel hub H. The pinions B⁰ and B¹⁰ are in constant mesh with their respective sun pinions A⁰ A¹⁰ mounted on the stationary spindle F⁰. The pinions B⁰ gear with an internal ring of teeth H¹ on the hub and attached to the block B* is an internal ring of teeth B²⁰ gearing with the planet pinions B¹⁰.

For the normal gear the planet pinions A⁰ and A¹⁰ are locked together and rotate as one. These pinions being held in this position by the springs E⁰ and E¹⁰ as shown in Fig. 8. The motion of the driver is transmitted to the planet pinions B⁰ which project through cut away portions of the block B* and engage with the teeth on the hub. The teeth B²⁰ also tend to rotate the planet pinions B¹⁰ but these are locked to the planet pinions B⁰, the whole gear being thus locked and permitting the wheel hub to be rotated at the same speed as the driver.

In the low phase of the gear which corresponds with that shown in Fig. 2, the motion of the driver is transmitted by the internal ring of teeth B²⁰ to the planet pinions B¹⁰ rotating upon the sun pinion A¹⁰ which has been locked by the movement of the operating rod D⁰. These planet pinions being carried by the hub transmit rotary motion to it.

In the high speed of the gear, the planet pinion A⁰ is held stationary and the pinion A¹⁰ is disengaged from its stationary clutch by the spring E¹⁰, motion to the driver is conveyed by the pinions B⁰ rotating upon the sun pinion A⁰, to the internal ring of teeth H¹ on the hub and this is the highest speed of the gear.

What we claim as our invention and desire to secure by Letters Patent is—

1. In a multiple speed-gear the combination of two sets of planet-pinions, a support, two rotatable parts both borne by said support and each carrying one set of the planet-pinions a gear-ring also carried by each part engaged with the planet-pinions of the other set, bearing-balls between adjacent races on the two rotatable parts, two locking-members fixed on said support, two co-axial sun-pinions one allotted to each set of planet-pinions, each sun-pinion being borne by and rotatable around said support and having two locking-devices one device on each end and furthermore being movable endwise along the support, yielding means tending to keep the sun-pinions clear of the locking-devices on the support and interlocked with one another, means for moving each of the sun-pinions into engagement with one of the two locking-members, and stops for the sun-pinions, to limit the motion of each sun-pinion away from the related stationary locking-member and prevent said pinion from becoming un-meshed from its planet-pinion.

2. In a multiple speed gear the combination of two sets of planet-pinions, a support, two rotatable parts both borne by said support and each carrying one set of the planet-pinions a gear-ring also carried by each part engaged with the planet-pinions of the other set, two locking-members fixed on said support, two co-axial sun-pinions one allotted to each set of planet-pinions, each sun-pinion being borne by and rotatable around said support and having two locking-devices one device on each end and furthermore being movable endwise along the support, yielding means tending to keep the sun-pinions clear of the locking-devices on the support and interlocked with one another, means for moving each of the sun-pinions into engagement with one of the two locking-members, and stops for the sun-pinions to limit the motion of each sun-pinion away from the related stationary locking-member and prevent said pinion from becoming un-meshed from its planet-pinion.

3. In a multiple speed gear the combination of two sets of planet-pinions, a support, two rotatable parts both borne by said support and each carrying one set of the planet-pinions a gear-ring also carried by each part engaged with the planet pinions of the other set, two locking-members fixed on said support, two co-axial sun-pinions one allotted to each set of planet-pinions, each sun-pinion being borne by and rotatable around said support and having a locking device that is in juxta-position with one of the fixed locking members and furthermore being movable endwise along the support, yielding means tending to keep the sun-pinions clear of the locking-devices on the support, means for moving each of the sun-pinions into engagement with one of the two locking-members, and stops for the sun-pinions to limit the motion of each sun-pinion away from the related stationary locking-member and prevent said pinion from becoming unmeshed from its planet-pinions.

4. In a multiple speed gear the combination of two sets of planet-pinions, a support, two rotatable parts both borne by said support and each carrying one set of the planet-pinions a gear-ring also carried by each part engaged with the planet-pinions of the other set, two locking-members fixed on said support, two co-axial sun-pinions, one allotted to each set of planet-pinions, each sun-pinion being borne by and rotatable around said support and having a locking-device that is in juxta-position with one of the said stationary locking-members and furthermore being movable endwise along the support, yielding means tending to keep the sun-pinions clear of the locking devices on the support, and means for moving each of the sun-pinions into engagement with one of the two locking members.

5. In a multiple speed gear the combination of two sets of planet pinions, a spindle with a slot therein, two casings rotatable upon said spindle and each carrying one set of the planet-pinions a ring of teeth also carried by each casing engaging with the planet-pinions of the other set, bearing-balls interposed between the two casings, two clutch members fixed on said spindle, two co-axial sun-pinions one allotted to each set of planet-pinions, each sun-pinion being borne by and rotatable around said spindle, and each having two sets of clutch-teeth one set on each end and furthermore being movable endwise along the support, two springs one in compression between one end of each sun-pinion and the adjacent end of the fixed clutch member on the spindle, an operating rod extending into the slot of the spindle, and having a projection extending therefrom and occupying only a portion of the length of the slot in the spindle, and two slipper pieces in sliding engagement with the spindle and of a length less than that of the slot in the spindle one engaged with and allotted to each sun-pinion and each provided with a slot into which the projection from the operating rod enters, said slot being of a length greater than the length of the projection.

6. In a multiple speed gear the combination of two sets of planet-pinions, a spindle with a slot therein, two casings rotatable upon said spindle and each carrying one set of the planet-pinions a ring of teeth also carried by each casing engaging with the planet-pinions of the other set, two clutch members fixed on said spindle, two co-axial sun-pinions one allotted to each set of planet-pinions, each sun-pinion being borne by and rotatable around said spindle, and each having two sets of clutch-teeth one set on each end and furthermore being movable endwise along the support, two springs one in compression between one end of each sun-pinion and the adjacent end of the fixed clutch member on the spindle, an operating rod extending into the slot of the spindle, and having a projection occupying only a portion of the length of the slot in the spindle and two slipper pieces in sliding engagement with the spindle and of a length less than that of the slot in the spindle one engaged with and allotted to each sun-pinion and each provided with a slot into which the projection from the operating rod enters, said slot being of a length greater than the length of the projection.

7. In a multiple speed gear the combination of two sets of planet pinions, a spindle with a slot therein, two casings rotatable upon said spindle and each carrying one set of the planet-pinions a ring of teeth also carried by each casing engaging with the planet-pinions of the other set, two clutch members fixed on said spindle, two co-axial sun-pinions one allotted to each set of planet-pinions, each of said sun-pinions being borne by and rotatable around said spindle and each having clutch teeth and furthermore being movable endwise along the support, an operating rod extending into the slot of the spindle and having a projection occupying only a portion of the length of the slot in the spindle, and two slipper-pieces in sliding engagement with the spindle and of a length less than that of the slot in the spindle one engaged with and allotted to each sun-pinion and each provided with a slot into which the projection from the operating-rod enters, said slot being of a length greater than the length of the projection.

8. In a multiple speed gear the combination of two sets of planet-pinions, a spindle with a slot therein, two casings rotatable upon said spindle, and each carrying one set of the planet-pinions a ring of teeth also carried by each casing engaging with the planet-pinions of the other set, two clutch members fixed on said spindle, two co-axial sun-pinions one allotted to each set of planet-pinions, each of said sun-pinions being borne by and rotatable around said spindle, and each having two sets of clutch teeth one set on each end and furthermore being movable endwise along the support, two springs one in compression between one end of each sun-pinion and the adjacent end of the fixed clutch-member on the spindle, and an operating rod in operative connection with the sun-pinions and stops for the sun-pinions to limit the motion of each sun-pinion away from the related stationary locking-member and prevent said pinion from becoming un-meshed from its planet-pinions.

9. In a multiple speed gear the combination with two separate sets of planet pinions of a separate sun pinion allotted to each set and always in mesh with its respective planet pinions, a stationary member contiguous to each sun pinion, means for locking either pinion to its respective stationary member, means for locking the sun pinions together and a spring acting upon each sun pinion and tending always to force them together.

10. In a multiple speed gear the combination with two separate sets of planet pinions of a separate sun pinion allotted to each set and always in mesh with its respective planet pinions, a stationary member contiguous to each sun pinion, means for locking either pinion to its respective stationary member and means for moving the pinions along the spindle.

11. In a multiple speed gear the combination with two separate sets of planet pinions of a separate sun pinion allotted to each set and always in mesh with its respective planet pinions, a stationary member contiguous to each sun pinion, means for locking either of the pinions to its respective stationary member, means for locking the sun pinions together, a spring acting upon each sun pinion and tending to force them together, and means for moving the pinions along the spindle.

In testimony whereof we have signed our names to this specification in the presence of two subscribing witnesses.

FREDERICK EASOM.
THEODORE JAMES BIGGS.

Witnesses:
H. L. DAVEY,
JAS. I. ALLBRITT.